United States Patent [19]

Palau

[11] Patent Number: 4,753,268
[45] Date of Patent: Jun. 28, 1988

[54] DOUBLE COUPLING FOR REMOVABLY JOINING TWIN PIPES

[75] Inventor: Joseph Palau, Duingt, France

[73] Assignee: S.A. des Establissements Staubli, Faverges, France

[21] Appl. No.: 84,210

[22] Filed: Aug. 12, 1987

[30] Foreign Application Priority Data

Sep. 1, 1986 [FR] France .................. 86 12397

[51] Int. Cl.⁴ .......................................... F16K 31/44
[52] U.S. Cl. ................................ 137/595; 285/137.1; 285/317; 285/914; 251/149.6
[58] Field of Search ................... 285/137.1, 304, 914, 285/1, 317; 137/595; 251/149.6

[56] References Cited

U.S. PATENT DOCUMENTS

| 1,292,367 | 1/1919 | Pettis ...................... 285/914 X |
| 2,538,259 | 1/1951 | Merriman ................. 285/1 X |
| 2,930,633 | 3/1960 | Ethington et al. ........ 285/137.1 X |
| 3,125,359 | 3/1964 | Charles .................... 285/137.1 X |
| 3,279,827 | 10/1966 | Brown ..................... 285/137.1 X |
| 4,116,476 | 9/1976 | Porter et al. ............. 285/914 X |

Primary Examiner—Dave W. Arola
Attorney, Agent, or Firm—Dowell & Dowell

[57] ABSTRACT

This invention relates to a double coupling for removably joining twin pipes, wherein the two connectors of the male piece engage in parallel bores in the female piece, and one of them cooperates with a bolt mechanism which ensures removable assembly of the two pieces. In a variant, the bolt is disposed between the two bores in order to cooperate with the two connectors.

8 Claims, 4 Drawing Sheets

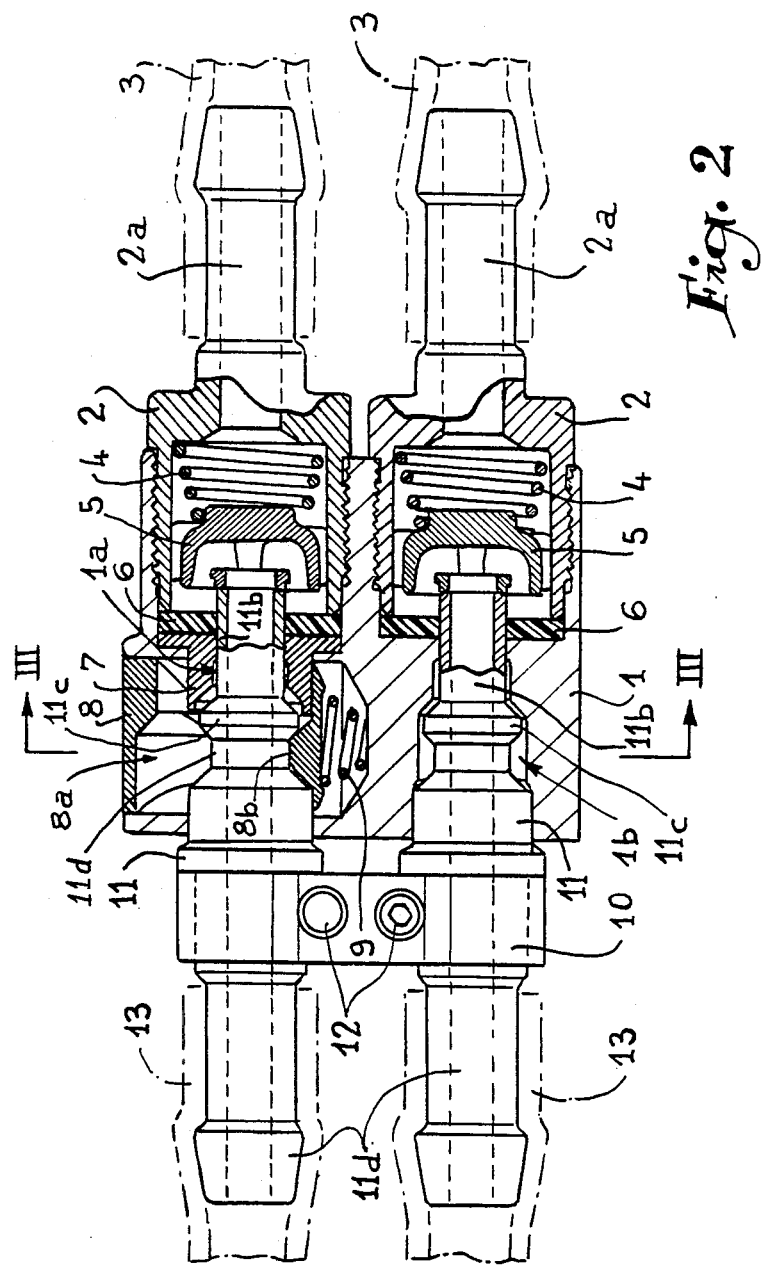

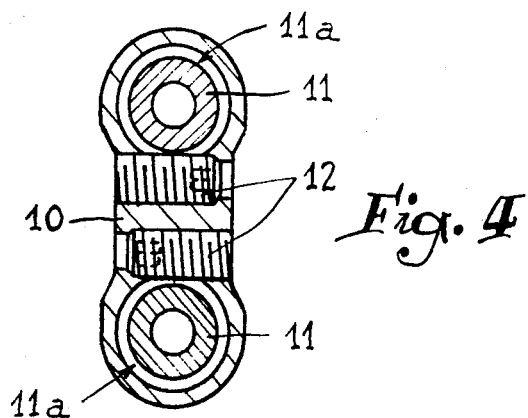
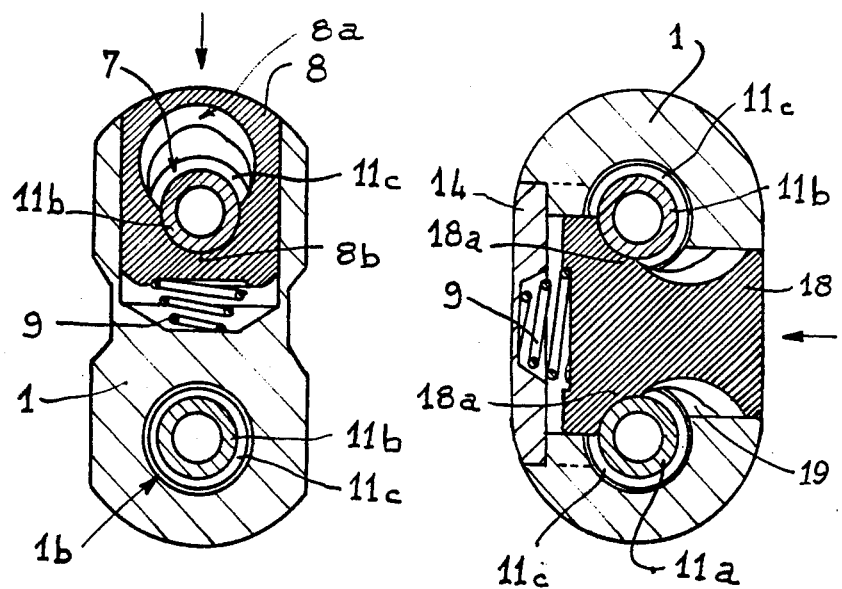

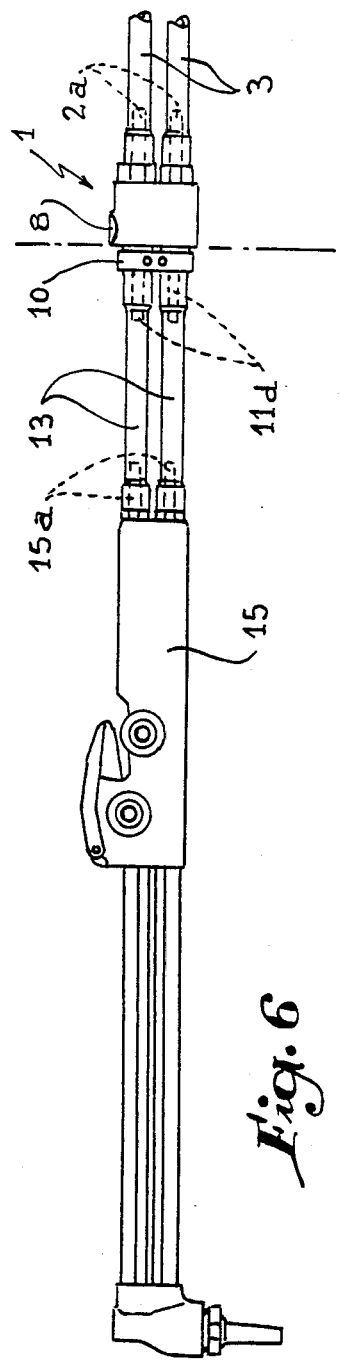
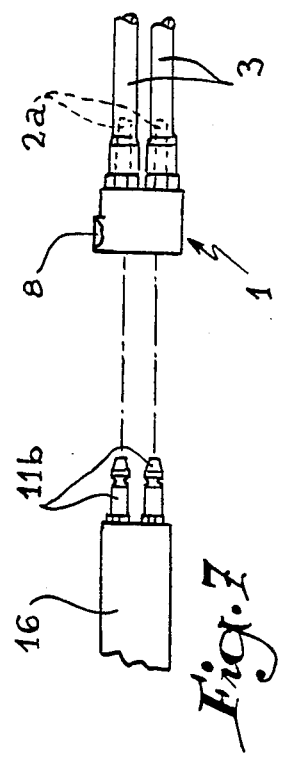

– –

DOUBLE COUPLING FOR REMOVABLY JOINING TWIN PIPES

BACKGROUND OF THE INVENTION

Field of the Invention

The present invention relates to supply installations comprising two parallel pipes for feeding two different fluids to the same apparatus and which are capable of being instantaneously connected and disconnected.

By way of example, such installations include oxyacetylene torches for welding and cutting, where it is desired to maintain the torches removable from the gas supply and which are consequently joined by rapid-action couplings to twin supply pipes.

SUMMARY OF THE INVENTION

In order to simplify the maneuvers of connection and disconnection, the invention relates to a double coupling or union which is essentially noteworthy in that it comprises, on the one hand, a male piece provided with two connectors oriented parallel to each other, and, on the other hand, a female piece which has two corresponding bores made therein, adapted hermetically to receive the two connectors and which includes a single locking mechanism adapted to ensure this assembly of the two male and female pieces.

BRIEF DESCRIPTION OF THE DRAWINGS

The invention will be more readily understood on reading the following description with reference to the accompanying drawings, in which:

FIG. 2 reproduces FIG. 1 after the two pieces have been fitted together and assembled.

FIGS. 3 and 4 are transverse sections along planes III—III (FIG. 2) and IV-IV (FIG. 1), respectively.

FIG. 5 is a transverse section similar to that of FIG. 3, but corresponding to a variant embodiment.

FIG. 6 is a side view illustrating the supply of a welding torch via a double coupling according to the invention.

FIG. 7 is a similar partial view corresponding to another embodiment of the invention.

DESCRIPTION OF THE PREFERRED EMBODIMENT

Figure 1:
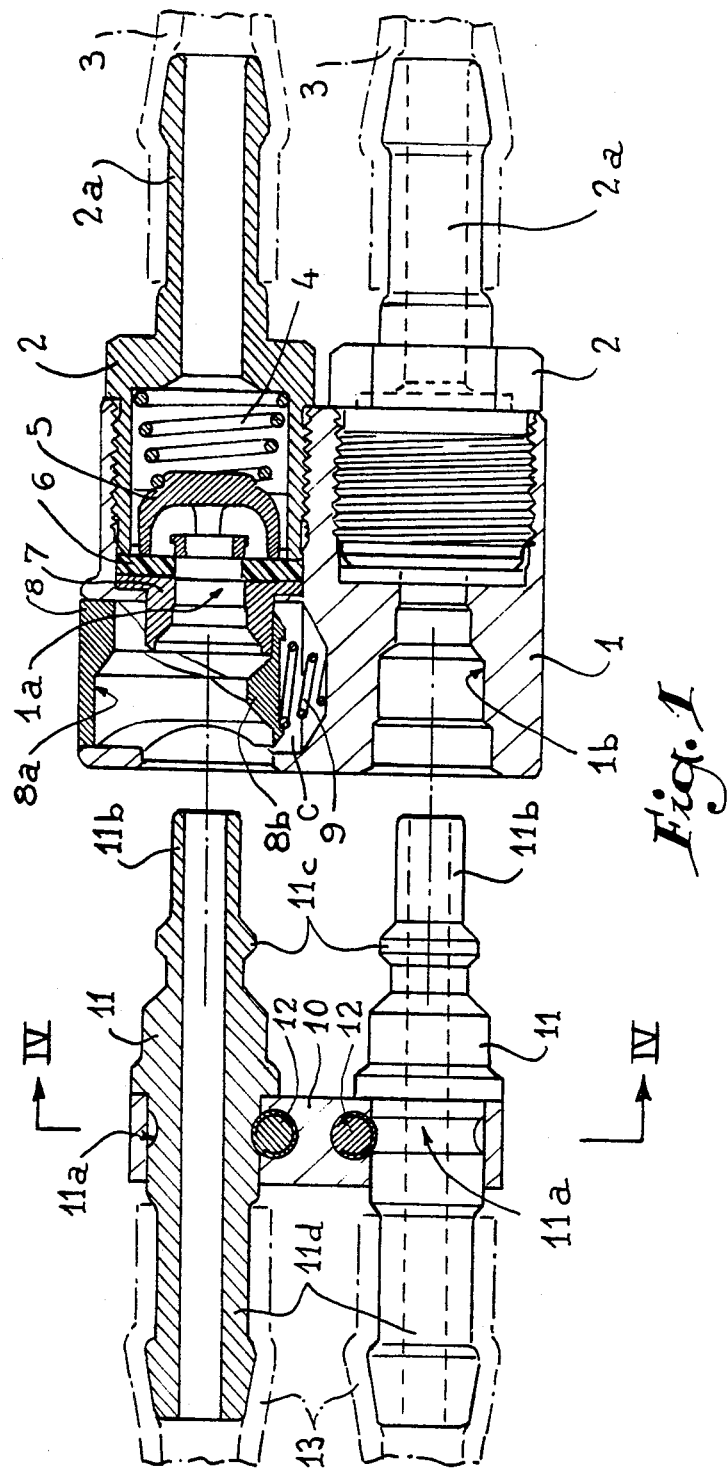
FIG. 1 is an axial section through a double union according to the invention, the two constituent pieces being shown prior to being fitted together.

Referring now to the drawings, the coupling shown in FIGS. 1 to 4 firstly comprises a solid female piece 1 which has two opening bores 1a and 1b made therein, oriented parallel to each other along the principal axis of the piece 1. Each bore 1a and 1b extends inside the hollow part of a bush 2 screwed in the opening of the bore in question and provided with an axial shank 2a of such section as to allow the end of a flexible pipe to be secured thereto as shown at 3. Against an annular shoulder of each bush 2 abuts a spring 4 which acts on a valve 5 in order to maintain it resiliently applied against an O-ring 6.

It should be observed that, in front of the O-ring 6, the bore 1a is sectioned to define a chamber C which opens transversely opposite the bore 1b, this chamber containing a movable bolt 8 associated with a spring 9 which tends to expel the bolt laterally. The displacement of the bolt under the effect of the spring 9 is limited by a ring 7 provided in front of the O-ring 6 and engaged with clearance in an opening 8a made in the bolt 8, which opening 8a defines a tooth 8b.

In order to simplify explanations concerning the section of opening 8a and of tooth 8b of the bolt 8, reference is made to the detailed description thereof given in Applicant's French Pat. No. 74 25774 (2 278 031) filed on July 12, 1974.

The double coupling according to the invention also comprises a male piece 10 (FIGS. 1, 2 and 4) which is provided with two parallel bores inside each of which is engaged a connector 11, retained axially in place by means of a screw 12 which is screwed in a tapping in piece 10 so as to intersect a groove 11a in the corresponding connector. Each connector 11 comprises a cylindrical extension 11b provided with an annular boss 11c adapted to cooperate with the tooth 8b of the bolt 8. Opposite this extension 11b, each connector 11 comprises an axial shank 11d adapted to fit in a flexible pipe such as 13.

It will be understood that, when pieces 1 and 10 of the double coupling are brought together with a view to engaging them, the extensions 11b of the connectors 11 engage in the bores 1a and 1b, and repel the valves 5 until they are brought into open position (FIG. 2), placing pipes 3 and 13 in open communication with one another.

During introduction, the boss 11c of the connector 11 which is engaged in the bore 1a of the female piece 1 abuts against the tooth 8b, causing momentary lowering of the bolt 8 against the spring 9. As soon as this boss 11c has passed axially beyond tooth 8b, the bolt 8 returns into its upper position within a locking recess 11d thereby ensuring retention of the two pieces 1 and 10 in the assembled position.

It will be readily appreciated that the dissociation of the two pieces of the double coupling according to the invention simply involves lowering the bolt 8 and axially withdrawing said pieces. The operations of connection and of disconnection employ solely the bolt 8. This simplifies the use of the coupling which, moreover, is of reduced dimensions with respect to the two elementary couplings conventionally used for joining twin pipes.

FIG. 5 illustrates a variant embodiment in which the bolt, here referenced 18, is disposed within a transverse opening or chamber 19 so as to be between the two bores 1a and 1b of the female piece 1. The bolt is shaped so as to present two opposite lateral teeth 8a of semi-circular section to ensure simultaneous retention of the two extensions 11b. The spring 9 associated with the double bolt 18 abuts against a plate 14 appropriately arranged in the transverse opening of the piece 1.

Other embodiments of a female piece pierced with two parallel bores and equipped with a single-control bolt, adapted to retain pieces 1 and 10 in the fitted position, may also be imagined.

FIG. 6 illustrates the application of the double coupling according to the invention to the supply of a welding torch 15 of conventional type, of which the rear part forming the handle is provided with two conventional connectors 15a; it is on these connectors 15a that the free ends of the flexible pipes 13 are attached so as to communicate with the axial shanks 11d of the coupling described with reference to FIGS. 1 to 4.

However, one may go further and consider the rear part of the torch (referenced 16 in FIG. 7) as the male piece 10 itself of the double coupling, and provide this rear part with the two connectors 11 so that the two extensions 11b cooperate with the female piece 1 of the double coupling. In this way, the intermediate pipes 13 are avoided, this substantially improving maneuverability of the torch.

It must, moreover, be understood that the foregoing description has been given only by way of example and that it in no way limits the domain of the invention which would not be exceeded by replacing the details of execution described by any other equivalents. In particular, the two connectors 11 and/or their extension 11b may be shaped differently in order to avoid any error of connection. In certain cases, the loaded valves 5 may be housed inside the male piece 10 by appropriately shaping the connectors 11.

What is claimed is:

1. A quick disconnect coupling assembly for concurrently joining pairs of fluid conduits comprising a female member having first and second spaced bores therethrough which are aligned along generally parallel axes, a chamber extending generally transversely with respect to said first bore and being in open communication therewith, a locking bolt means movably carried within said chamber so as to be laterally adjustable relative to the axis of said first bore, resilient means for urging said locking bolt means at least partially into said first bore, first and second male members, means for connecting said first and second male members in generally parallel relationship so as to be spaced apart a distance substantially equal to the spacing between the axes of said first and second bores of said female member, each of said first and second male members having an outer end portion of a size to be slidingly receivable within said first and second bores of said female member, at least said first male member having a locking recess formed along said outer end portion thereof, said locking bolt being engageable within said locking recess as said first male member is inserted within said first bore whereby said resilient means will retain said locking bolt means within said locking recess of said first male member thereby resiliently locking each of said first and second male members within said female member.

2. The quick disconnect coupling assembly of claim 1 including a pair of valve members, said valve members being mounted within said first and second bores, a pair of valve seat means disposed within each of said first and second bores, resilient means mounted within said first and second bores for normally urging said valves into a closed position against said valve seats, said valves being displacable from said valve seats as said first and second male members are inserted within said first and second bores.

3. The quick disconnect coupling assembly of claim 2 in which each of said valve seats includes a yieldable ring member, said yieldable ring member having a central opening therethrough which is an axial alignment with the axis of said first and second bores, said opening through said annular member being of a size to permit said end portions of said male member to be extended therethrough with said ring members being in sealed relationship with said end portions of said first and second male members.

4. The quick disconnect coupling assembly of claim 2 including first and second bush means mounted within said first and second bores, each of said bush means having an outer end portion extending from said female member whereby a fluid conduit may be selectively connected to said outwardly extending portions of said first and second bush members.

5. The quick disconnect coupling assembly of claim 2 including a motion limiting ring means mounted within said first bore means, said motion limiting ring means having an opening therethrough which is generally axially aligned with the axis of said bore means, said motion limiting ring means being selectively engageable with said locking bolt means so as to limit the lateral displacement of said locking bolt means relative to said first bore means.

6. The quick disconnect coupling assembly of claim 1 in which said recesses formed in said male members are created adjacent one side of an annular boss which is formed along said outer end portion of said male members.

7. The quick disconnect coupling assembly of claim 1 in which said chamber is in open communication with each of said first and second bores in said female member, said bolt means including first and second generally opposite teeth means which are extendable into said first and second bores, said resilient means normally urging said bolt means into position wherein said opposite teeth means are located within said first and second bores and being yieldable so as to allow said teeth means to be displaced relative to the axis of said first and second bores, each of said male members having a locking recess formed along said outer portion thereof, said opposite teeth of said locking bolt means being engageable with said locking grooves in said first and second male members when said first and second male members are inserted within said first and second bores of said female member.

8. The quick disconnect coupling assembly of claim 7 in which each of said male members include an annular boss extending outwardly along said outer end portions thereof, said locking recesses being defined by a portion of said outer end portions immediately adjacent said annular bosses.

* * * * *